(12) United States Patent
Schilz et al.

(10) Patent No.: US 7,686,530 B2
(45) Date of Patent: Mar. 30, 2010

(54) BALL JOINT ARRANGEMENT

(75) Inventors: Arnold Schilz, Lahnstein (DE); Richard Strupp, Trier (DE); Reiner Weber, Wiltingen (DE)

(73) Assignee: Stabilus GmbH, Koblenz (DE)

( * ) Notice: Subject to any disclaimer, the term of this patent is extended or adjusted under 35 U.S.C. 154(b) by 82 days.

(21) Appl. No.: 11/999,567

(22) Filed: Dec. 6, 2007

(65) Prior Publication Data
US 2008/0138151 A1 Jun. 12, 2008

(30) Foreign Application Priority Data
Dec. 7, 2006 (DE) ........................ 10 2006 057 557

(51) Int. Cl.
*F16C 11/00* (2006.01)
(52) U.S. Cl. ................. 403/141; 403/113; 403/122; 403/129; 403/144; 403/326; 403/329
(58) Field of Classification Search ................. 403/113, 403/122, 129, 132, 133, 135, 141, 144, 326, 403/329, 330; 362/515
See application file for complete search history.

(56) References Cited

U.S. PATENT DOCUMENTS

| 4,720,205 | A | * | 1/1988 | Ito | 403/140 |
| 4,758,110 | A | * | 7/1988 | Ito | 403/140 |
| 5,641,235 | A | * | 6/1997 | Maughan et al. | 403/133 |
| 5,782,573 | A | * | 7/1998 | Dorr et al. | 403/135 |
| 6,398,446 | B1 | * | 6/2002 | Pazdirek et al. | 403/134 |
| 6,551,006 | B2 | * | 4/2003 | Kincaid et al. | 403/130 |
| 7,188,563 | B2 | * | 3/2007 | Liebig et al. | 92/187 |

FOREIGN PATENT DOCUMENTS

DE 198 13 721 10/1999

* cited by examiner

*Primary Examiner*—Daniel P Stodola
*Assistant Examiner*—Nahid Amiri
(74) *Attorney, Agent, or Firm*—Cohen Pontani Lieberman & Pavane LLP (57) ABSTRACT

Socket housing has a hemispherical ball socket and a plurality of circumferentially spaced retaining tongues which extend toward an insertion opening, the tongues being radially pivotable to engage over the equator of a ball head. An outer part has an insertion region and a receiving opening into which the socket housing can be inserted in an insertion direction via the insertion region, the insertion region having an inside surface defining an opening with a cross-sectional area which is larger than a cross-sectional area defined by an inside surface of the receiving opening. The retaining tongues are in contact with the inside surface of the receiving opening when the socket housing is in the installed position. A locking device prevents movement of the socket housing counter to the insertion direction when the socket housing is in the installed position.

16 Claims, 6 Drawing Sheets

BALL JOINT ARRANGEMENT

BACKGROUND OF THE INVENTION

1. Field of the Invention

The invention relates to a ball joint arrangement, in particular for articulatedly connecting gas springs to associated implement parts, having a ball head which is pivotably mounted in a closed hemispherical ball socket which is formed in a socket housing. The ball socket leads outwards via an insertion opening and has, in the region aligned towards the insertion opening, a plurality of pivotable retaining tongues which project freely towards the insertion region, are spaced apart from one another in the peripheral direction and engage over the ball head over its equator, with a journal which is arranged on the ball head and has a smaller diameter than the ball head projecting through the insertion opening. An annular outer part has a receiving opening into which the socket housing can be inserted in the insertion direction over an insertion path into an installed position. The socket housing, in the installed position, can be locked by means of a locking device so as to prevent a movement counter to the insertion direction, and the retaining tongues which bear against the ball head are in contact at their outer periphery against the receiving opening which encloses them.

2. Description of the Related Art

In a ball joint arrangement of this type, it is known to form the receiving opening with a cross-sectional contour which is constant all the way through, so that the retaining tongues are held in their closed installed position already at the beginning of the insertion of the socket housing into the receiving opening.

SUMMARY OF THE INVENTION

It is therefore an object of the invention to create a ball joint arrangement of the type specified in the introduction which permits pre-assembly of the socket housing in the outer part.

According to the invention, the socket housing can be inserted into the receiving opening via an insertion region which is formed in the outer part, with the insertion region having a cross section which is larger radially than the cross section of the receiving opening.

By means of this design, the socket housing can be inserted into the receiving opening up to a pre-assembly position, with the retaining tongues, in the pre-assembly position in the insertion region, being pivotable so far radially outwards that the ball head can then still be inserted without resistance or force expenditure through the insertion opening into the ball socket which is provided in the socket housing.

Only during a further movement of the socket housing and an insertion of the socket housing into the receiving opening of the outer part are the retaining tongues held in their installed position in which they surround the ball head.

By means of the pre-assembly of the socket housing in the outer ring, it is possible for these two parts to be already assembled and shipped without it being necessary for these two parts to be separated from one another again during a later assembly of the ball head.

The ball head can then be inserted, without force expenditure, via the insertion opening into the pre-assembled socket housing, and after coming into contact against the ball socket, by means of further movement of the ball head, the latter can be moved together with the socket housing into the final installed position.

The insertion region and the receiving opening are preferably arranged coaxially with respect to one another.

If the insertion region has a cross section which narrows conically towards the receiving opening, then this conically narrowing region corresponds at least approximately to the outer contour of the splayed retaining tongues, and also forms a ramp as the socket housing is inserted into the receiving opening.

If the socket housing can be inserted over a part of the insertion path into the insertion region and the receiving opening into a pre-assembly position in which the retaining tongues are in contact with their radially outer side against the wall of the insertion region, then the contact of the retaining tongues against the wall of the insertion region generates an abrupt increase in the insertion resistance, which serves to define the attainment of the pre-assembly position.

Here, in the pre-assembly position, the radially encircling outer contour of the region of the retaining tongues preferably corresponds to the wall contour of the insertion region.

In order to prevent an autonomous release of the pre-assembled socket housing from the outer part, the socket housing can be locked in the pre-assembly position on the outer part so as to prevent a movement counter to the insertion direction.

Here, in a simple, self-locking manner, the socket housing has one or more cams which project radially into the receiving opening or depressions which are formed in the wall of the receiving opening. These which cams or depressions can be engaged by one or more radially outwardly resilient pre-loaded latching springs of the socket housing in the pre-assembly position at their side which faces axially away from the insertion region, or into which cams or depressions the latching springs can engage.

For this purpose, the latching springs can be spring arms which are arranged on the socket housing, which spring arms extend increasingly away from the socket housing in the direction of the insertion region. The free end regions of the spring arms can engage behind the cams or the free end regions of the spring arms can engage into the depressions.

Here, as the socket housing is inserted, the spring arms slide over the cams or depressions and then, with their free ends, block a movement counter to the insertion direction.

Likewise in a simple, autonomously locking manner, the locking device for locking the socket housing in the installed position can have one or more spring detents of the socket housing, which can engage behind one or more locking lugs which project into the receiving opening, or which can engage into one or more locking recesses which are formed in the wall of the receiving opening.

Here, the spring detents can be locking spring arms which are arranged on the socket housing and which extend increasingly away from the socket housing in the direction of the insertion region. The two end regions of the locking spring arms can to engage behind the locking lugs or the free end regions of the locking spring arms can engage into the locking recesses.

The locking arms therefore pass over the locking lugs or locking recesses as the socket housing is inserted, in order to then, in the installed position, block a movement of the socket housing counter to the insertion direction.

If the cams and the locking lugs or the depressions and the locking recesses are arranged in series at a spacing in the insertion direction, and the locking spring arms at the same time form the spring arms, then the locking arms perform a dual function, and the ball joint arrangement is considerably simplified.

In order to be able to act on the locking arms in the release direction, the receiving opening can be formed so as to extend all the way through the outer part.

In order to increase the pivoting capacity of the ball head and of the journal in the socket housing, two diametrically opposed gaps can be formed between the retaining tongues, which gaps are the same size as or larger than the diameter of the journal.

For clear definition of the installed position, the socket housing preferably has one or more insertion stops and can be inserted into the receiving opening in the insertion direction until the insertion stops come into contact against mating stops of the outer part in the receiving opening.

Here, in a dual function, the locking lugs can form the mating stops.

If the socket housing and/or the outer part is a plastic part, in particular an injection-moulded plastic part, then the parts are corrosion-resistant, require no lubrication and prevent disturbing noise during a pivoting movement of the ball head in the ball socket.

In addition, they are easy to produce as integrated components.

For fastening of the outer part, the outer part can have a fastening shank which extends transversely with respect to the extent of the receiving opening.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

The ball joint arrangements illustrated in the figures have an annular outer part 1 with a receiving opening 2 which extends all the way through and which has a fastening shank 3 which extends transversely with respect to the extent of the receiving opening 2.

With the fastening shank 3, the outer part 1 can be fastened to the free end of a piston rod 4 of a piston/cylinder unit, for example of a damper or of a gas spring 5, or to the closed end, which is situated opposite the piston rod 4, of the cylinder 5 of the gas spring 5.

A socket housing 8 can be inserted into the receiving opening 2 via an insertion region 7, with the insertion region 7 having a cross section which narrows conically towards the receiving opening 2. The receiving opening has a substantially axial wall.

A closed hemispherical ball socket 9 is formed coaxially in the socket housing 8, which ball socket 9 leads outwards via a coaxial insertion opening 10 and has, in the region aligned towards the insertion opening 10, a plurality of retaining tongues 11 which project freely towards the insertion region 10. The retaining tongues 11 which are arranged spaced apart from one another in a coaxial circle form a cage.

A ball head 12 can be inserted into the ball socket 9, which ball head 12 has a radial journal 13 of smaller diameter than the ball head 12, wherein the journal 13, when the ball head 12 is inserted into the ball socket 9, projects outwards through the insertion opening 10 and can be fastened to a component (not illustrated) which is to be moved.

Here, proceeding from the ball socket 9, the retaining tongues 11 project over the equator of the ball head 12 and have, at their free end regions, a radial cross section which enlarges towards the free end of the retaining tongues 11.

At the end opposite from the insertion opening 10, two locking spring arms 14 are integrally formed diametrically oppositely on the plastic socket housing 8, which locking spring arms 14 extend increasingly away from the socket housing 8 in the direction of the insertion region 7.

From the side of the insertion region 7, cams 15 and locking lugs 16 are arranged in series in the outer part 1 at an axial spacing so as to project radially into the receiving opening 2.

If the socket housing 8 is inserted with the end of the ball socket 9 first via the insertion region 7 into the receiving opening 2 of the outer part 1, then the free ends of the locking spring arms 14 slide, with a radially outwardly aligned contact force, along the wall of the receiving opening 2 until they have slid beyond the cams 15 and engage with their free ends behind the cams 15.

In the pre-assembly position, the outer contour of the resiliently outwardly-splayed retaining tongues 11 is in contact against the wall contour of the insertion region 7.

In this state, the pre-assembled module composed of the outer part 1 and the socket housing 8 is transportable, with the socket housing 8 being prevented from being released from the outer part 1 by locking spring arms 14 which engage behind the cams 15.

For the further assembly of the ball head 12, the latter is inserted with little force or without force expenditure into the cage-like insertion opening 10 until it comes into contact in the ball socket.

If the ball head 12 is now acted on further with increased force in the insertion direction 17, the socket housing 8 is pushed into the receiving opening 2, wherein by means of the conical wall of the insertion region 7, the retaining tongues 11 are pivoted radially inwards, so as to surround the ball head 12 in the manner of a cage. The tongues 11 are then held in this closed position by the wall of the receiving opening 2, so that although the ball head 12 is mounted in the socket housing 8 so as to be pivotable, it is however fixedly held in the axial direction.

During insertion of the socket housing 8, the locking spring arms 14 slide, while being deflected radially inwards, over the locking lugs 16 and engage behind the latter, so that the socket housing 8 is prevented from moving counter to the insertion direction 17.

In this position, which forms the installed position of the socket housing 8 in the outer part 1, insertion stops 18 of the socket housing 8 come into contact against the sides, which face towards the insertion region 7, of the locking lugs 16 which serve as mating stops.

To release the socket housing 8, a tool can be inserted, from the side facing towards the insertion region 7, into the receiving opening 2 in order to pivot the locking spring arms 14 radially inwards.

Here, the socket housing 8 can be moved into the pre-assembly position and the ball head 12 can be guided out of the socket housing 8.

Figures 1, 2:
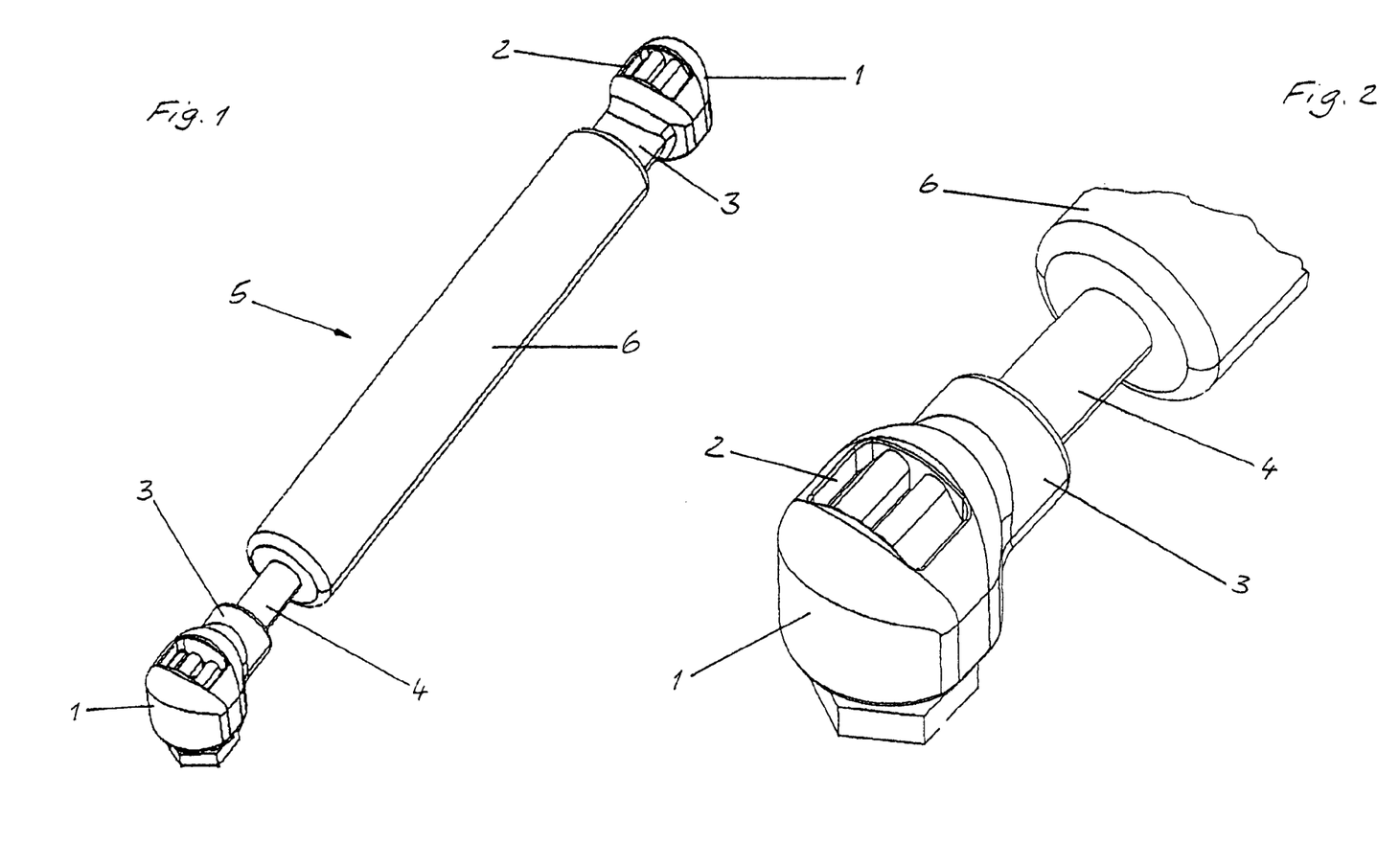
FIG. 1 shows a perspective view of a gas spring with a first exemplary embodiment of a ball joint arrangement at the closed end of the cylinder and at the free end of the piston rod of the gas spring.
FIG. 2 shows an enlarged perspective view of the ball joint arrangement as per FIG. 1 arranged on the piston rod.
Figures 3, 5:
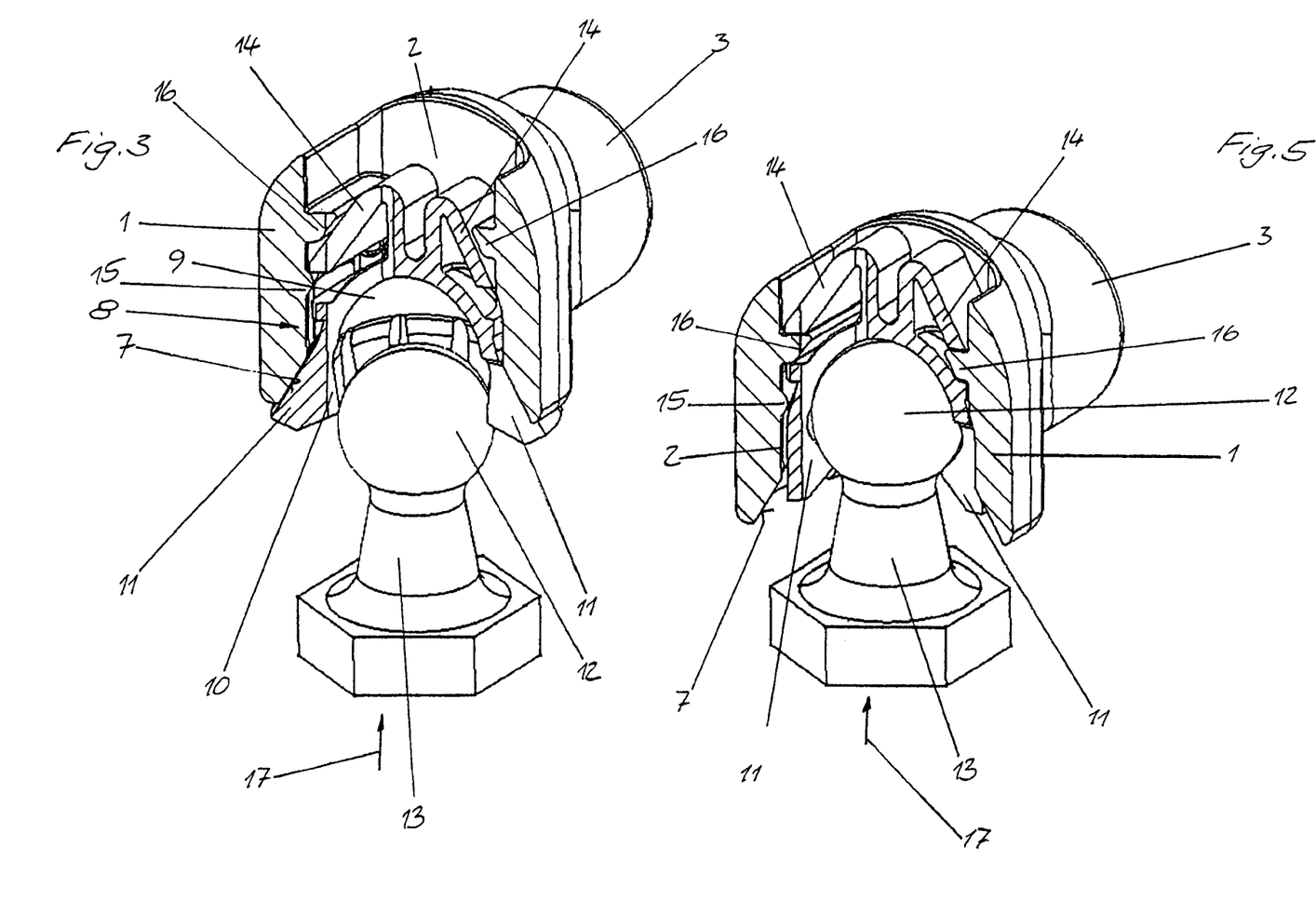
FIG. 3 shows a perspective side view of the ball joint arrangement as per FIG. 2 in the pre-assembly position in partial section.
FIG. 5 shows a perspective side view of the ball joint arrangement as per FIG. 2 in the installed position in partial section.
Figure 4:
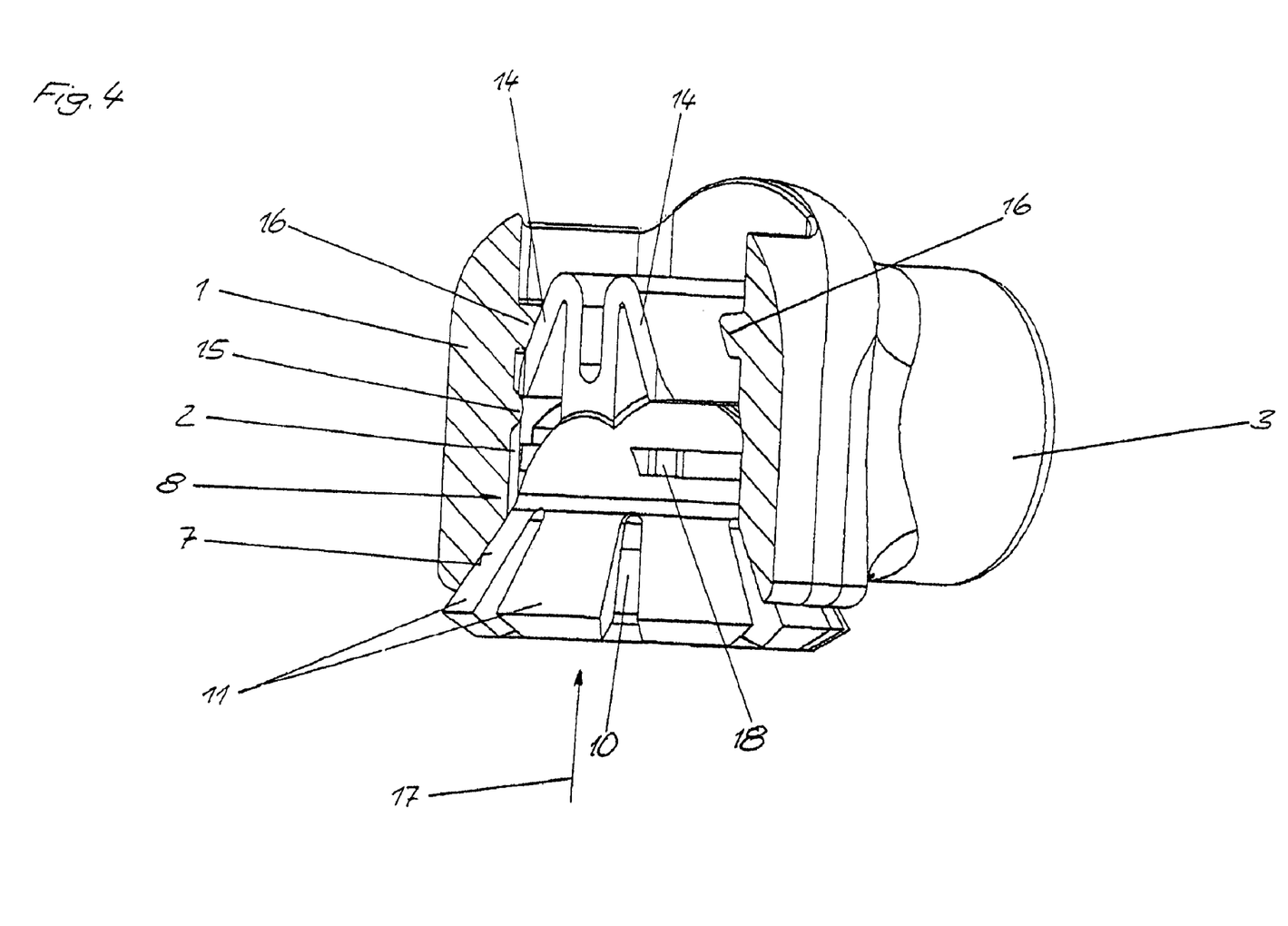
FIG. 4 shows a side view of the outer part and pre-assembled socket housing of the ball joint arrangement as per FIG. 2 in partial section.
Figures 6, 7:
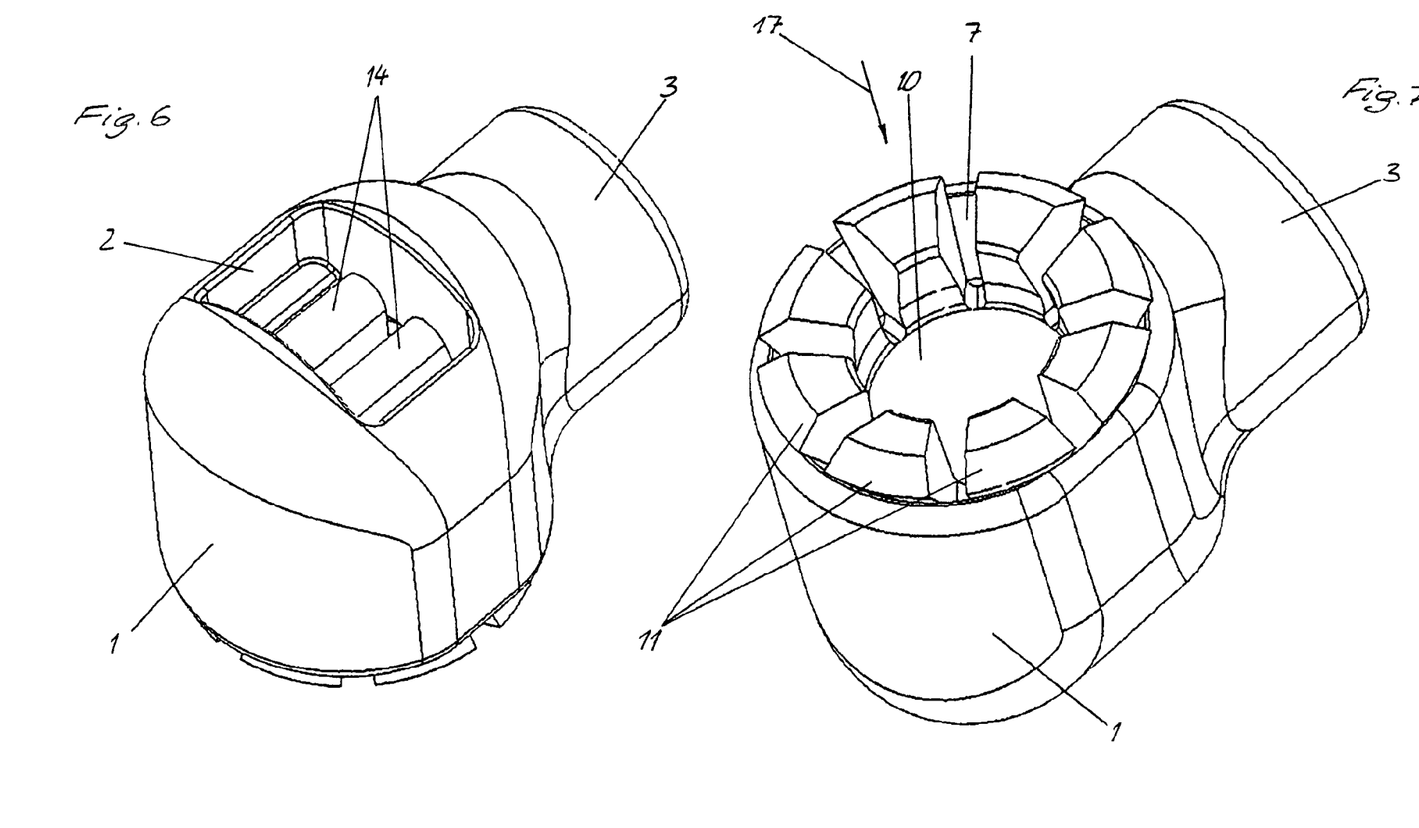
FIG. 6 shows a perspective plan view of the pre-assembled ball joint arrangement as per FIG. 2.
FIG. 7 shows a perspective view from below of the pre-assembled ball joint arrangement as per FIG. 2.
Figure 8:
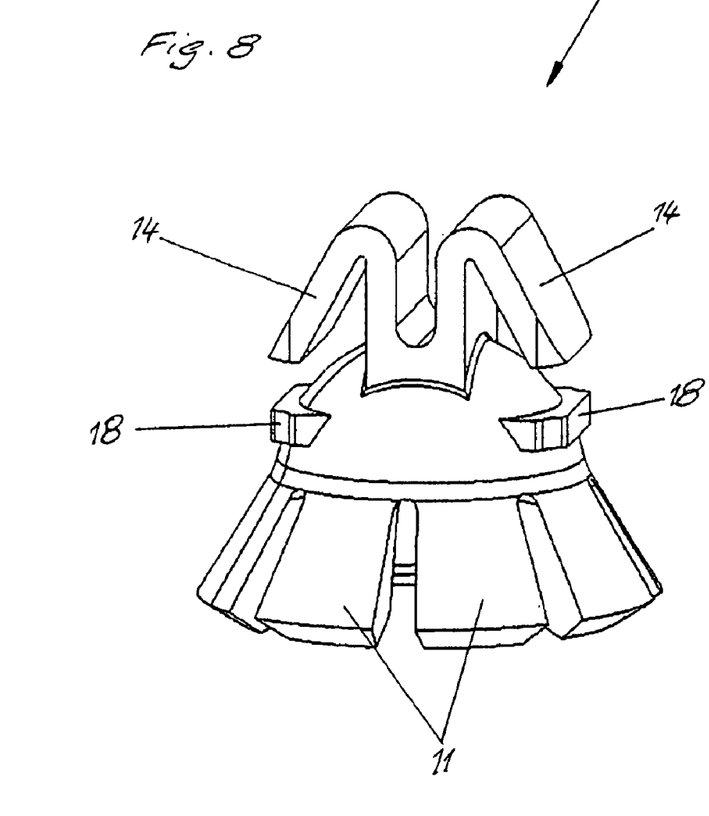
FIG. 8 shows a perspective side view of the socket housing of the ball joint arrangement as per FIG. 2.
Figure 9:
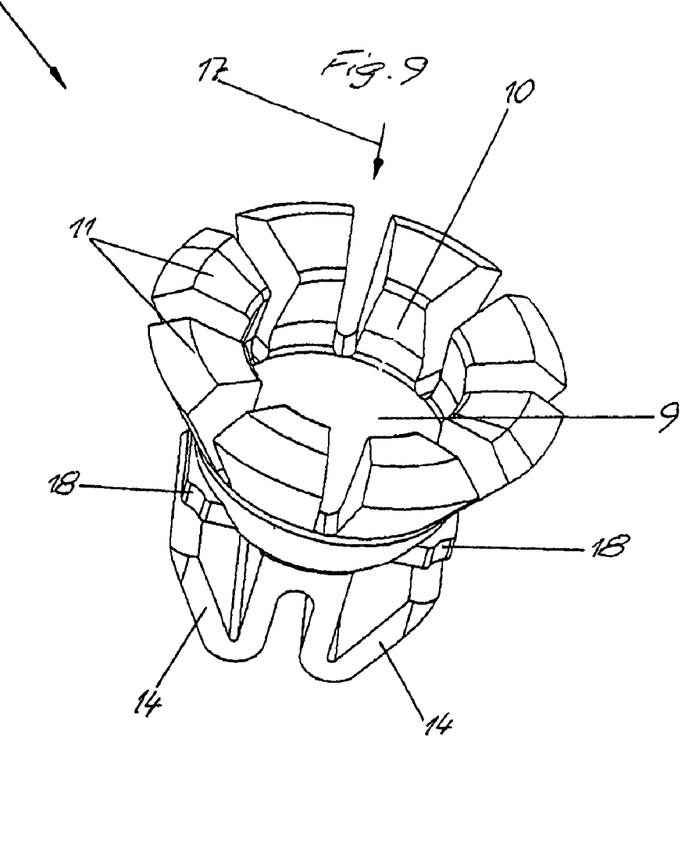
FIG. 9 shows a perspective view from below of the socket housing of the ball joint arrangement as per FIG. 2.
Figures 10, 11, 12, 13:
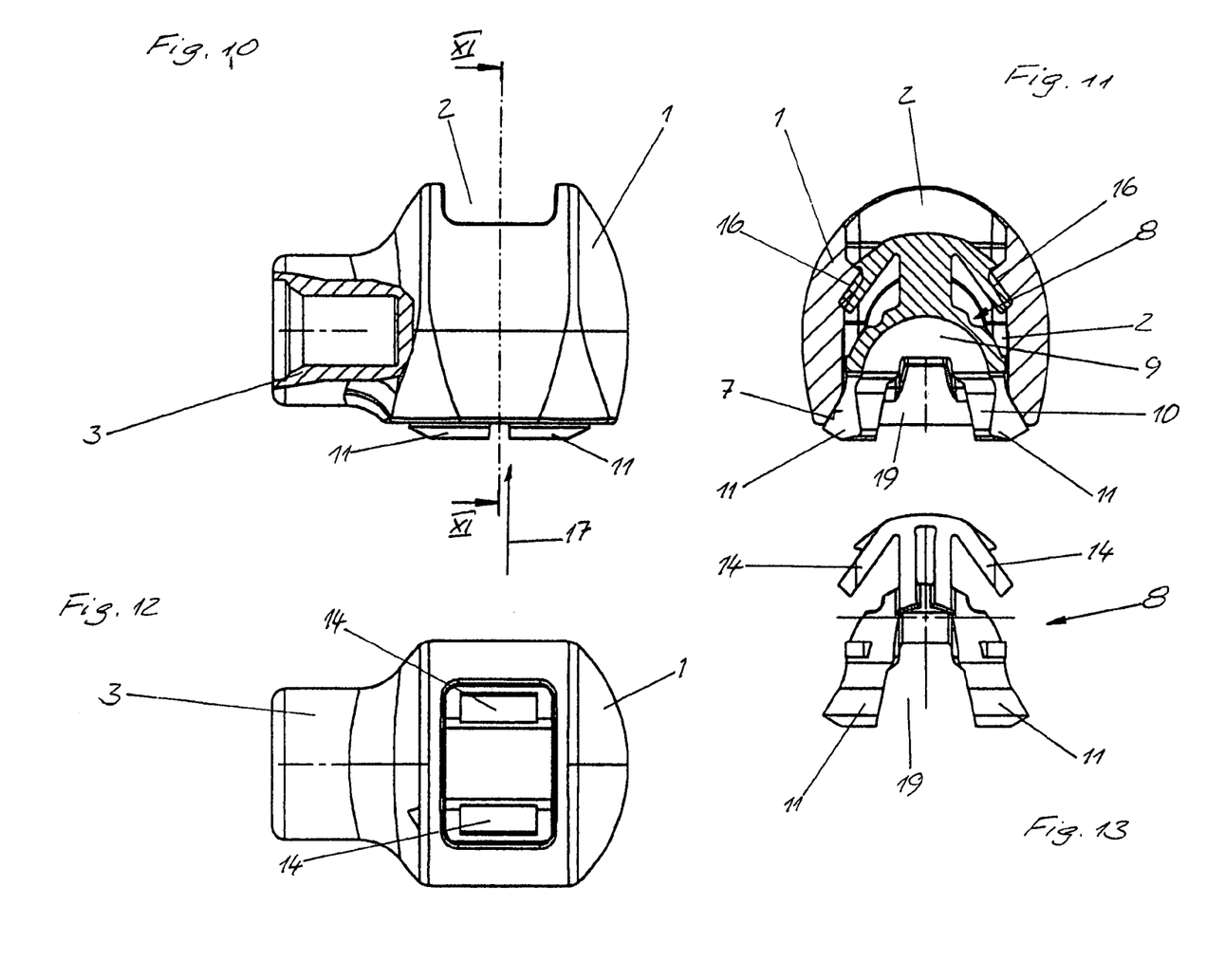
FIG. 10 shows a side view of a second exemplary embodiment of a ball joint arrangement.
FIG. 11 shows a cross section through the ball joint arrangement as per FIG. 10 along the line XI-XI.
FIG. 12 shows a plan view of the ball joint arrangement as per FIG. 10.
FIG. 13 shows a side view of the socket housing of the ball joint arrangement as per FIG. 10.

As shown in the exemplary embodiment of FIGS. 10 to 13, two diametrically opposed gaps 19 can be formed between the retaining tongues 11, which gaps are large enough that the journals 13 can pivot in. This permits an enlarged pivot range in the pivot direction of the journal 13, which is defined by the gaps.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A ball joint assembly comprising:
a ball head having an equator, the ball head being fixed to a journal having a smaller diameter than the ball head;
a socket housing having a hemispherical ball socket and a plurality of circumferentially spaced retaining tongues which extend toward an insertion opening, the tongues being radially pivotable to engage over the equator of the ball head, the journal extending though the insertion opening;
an outer part having an insertion region and a receiving opening into which the socket housing can be inserted via the insertion region, the insertion region having an inside surface defining an opening with a cross-sectional area which is larger than a cross-sectional area defined by an inside surface of the receiving opening, the socket housing being inserted in the receiving opening in an insertion direction to an installed position, the retaining tongues being in contact with the receiving opening when the socket housing is in the installed position, wherein the outer part has a fastening shank extending transversely of the receiving opening; and
a locking device which prevents movement of the socket housing counter to the insertion direction when the socket housing is in the installed position.

2. The ball joint assembly of claim 1 wherein the insertion region and the receiving opening are coaxial.

3. The ball joint assembly of claim 2 wherein the opening defined by the insertion region tapers conically toward the receiving opening.

4. The ball joint assembly of claim 1 wherein the socket housing can be inserted into the insertion opening to an inserted position in which the retaining tongues are in contact with the inside surface of the insertion region.

5. The ball joint assembly of claim 4 wherein the retaining tongues have an outer contour which, in the inserted position, fits against the inside surface of the insertion region.

6. The ball joint assembly of claim 4 further comprising means for locking the socket housing in the inserted position so that the socket housing cannot be moved counter to the insertion direction.

7. The ball joint assembly of claim 1 wherein the receiving opening extends through the outer part.

8. The ball joint assembly of claim 1 wherein the socket housing is formed with diametrically opposed gaps between the retaining tongues, the gaps being sized to accommodate the journal on the ball head.

9. The ball joint assembly of claim 1 wherein the socket housing has at least one insertion stop and the outer part has at least one mating stop in the receiving opening, each said insertion stop contacting a respective said mating stop to limit relative movement in the insertion direction.

10. The ball joint assembly of claim 1 wherein at least one of said outer part and said socket housing is an injection molded plastic part.

11. A ball joint assembly comprising:
a ball head having an equator, the ball head being fixed to a journal having a smaller diameter than the ball head;
a socket housing having a hemispherical ball socket and a plurality of circumferentially spaced retaining tongues which extend toward an insertion opening, the tongues being radially pivotable to engage over the equator of the ball head, the journal extending though the insertion opening;
an outer part having an insertion region and a receiving opening into which the socket housing can be inserted via the insertion region, the insertion region having an inside surface defining an opening with a cross-sectional area which is larger than a cross-sectional area defined by an inside surface of the receiving opening, the socket housing being inserted in the receiving opening in an insertion direction to an installed position, the retaining tongues being in contact with the receiving opening when the socket housing is in the installed position, wherein the socket housing can be inserted into the insertion opening to an inserted position in which the retaining tongues are in contact with the inside surface of the insertion region;
a locking device which prevents movement of the socket housing counter to the insertion direction when the socket housing is in the installed position, and
means for locking the socket housing in the inserted position so that the socket housing cannot be moved counter to the insertion direction, wherein the outer part further comprises one of cams which extend above the surface of the receiving opening and depressions which extend into the surface of the receiving opening, the socket housing having radially outward resilient latching members which engage respective ones of said one of said cams and said depressions to lock the socket housing in the pre-assembled position.

12. The ball joint assembly of claim 11 wherein the latching members are spring arms which extend away from the socket housing and toward the insertion region, the spring arms having distal ends which engage respective ones of said cams and said depressions.

13. The ball joint assembly of claim 11 wherein the outer part further comprises one of locking lugs and locking recesses in series with respective ones of said one of said cams and said depressions, said latching members engaging respective ones of said locking lugs and locking recesses in the installed position.

14. A ball joint assembly comprising:
a ball head having an equator, the ball head being fixed to a journal having a smaller diameter than the ball head;
a socket housing having a hemispherical ball socket and a plurality of circumferentially spaced retaining tongues which extend toward an insertion opening, the tongues being radially pivotable to engage over the equator of the ball head, the journal extending though the insertion opening;
an outer part having an insertion region and a receiving opening into which the socket housing can be inserted via the insertion region, the insertion region having an inside surface defining an opening with a cross-sectional area which is larger than a cross-sectional area defined by an inside surface of the receiving opening, the socket housing being inserted in the receiving opening in an insertion direction to an installed position, the retaining tongues being in contact with the receiving opening when the socket housing is in the installed position; and
a locking device which prevents movement of the socket housing counter to the insertion direction when the socket housing is in the installed position,
wherein the locking device comprises at least one locking lug or at least one locking recess on the outer part, and at least one spring detent on the socket housing, wherein each said spring detent engages a respective one of said at least one locking lug or said at least one locking recess in the installed position.

15. The ball joint assembly of claim 14 wherein each said spring detent is a spring arm extending away from the socket housing and toward the insertion region, each of said spring arms having a distal end which engages a respective one of said locking lugs and said locking recesses.

16. A ball joint assembly comprising:
a ball head having an equator, the ball head being fixed to a journal having a smaller diameter than the ball head;
a socket housing having a hemispherical ball socket and a plurality of circumferentially spaced retaining tongues which extend toward an insertion opening, the tongues being radially pivotable to engage over the equator of the ball head, the journal extending though the insertion opening;
an outer part having an insertion region and a receiving opening into which the socket housing can be inserted via the insertion region, the insertion region having an inside surface defining an opening with a cross-sectional area which is larger than a cross-sectional area defined by an inside surface of the receiving opening, the socket housing being inserted in the receiving opening in an insertion direction to an installed position, the retaining tongues being in contact with the receiving opening when the socket housing is in the installed position; and
a locking device which prevents movement of the socket housing counter to the insertion direction when the socket housing is in the installed position,
wherein the locking device comprises at least one locking lug on the outer part, the socket housing having at least one spring detent which engages a respective one of said at least one locking lug in the installed position, and at least one insertion stop which contacts a respective one of said at least one locking lug to limit relative movement in the insertion direction.

* * * * *